(12) United States Patent
Tsujikawa et al.

(10) Patent No.: US 9,246,150 B2
(45) Date of Patent: Jan. 26, 2016

(54) NON-AQUEOUS ELECTROLYTE BATTERY

(75) Inventors: Tomonobu Tsujikawa, Tokyo (JP); Masayasu Arakawa, Tokyo (JP); Hiroo Nishiyama, Tokyo (JP); Katsuhide Aichi, Tokyo (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 90 days.

(21) Appl. No.: 13/820,864

(22) PCT Filed: Sep. 6, 2011

(86) PCT No.: PCT/JP2011/070256
§ 371 (c)(1),
(2), (4) Date: Apr. 30, 2013

(87) PCT Pub. No.: WO2012/003309
PCT Pub. Date: Mar. 15, 2012

(65) Prior Publication Data
US 2013/0209860 A1    Aug. 15, 2013

(30) Foreign Application Priority Data
Sep. 6, 2010    (JP) .................................. 2010-199037

(51) Int. Cl.
*H01M 4/02*    (2006.01)
*H01M 2/16*    (2006.01)
*H01M 4/13*    (2010.01)
*H01M 10/052*    (2010.01)
*H01M 10/0585*    (2010.01)
*H01M 2/12*    (2006.01)
*H01M 4/36*    (2006.01)
*H01M 4/62*    (2006.01)
*H01M 10/42*    (2006.01)

(52) U.S. Cl.
CPC ............ *H01M 2/1673* (2013.01); *H01M 2/127* (2013.01); *H01M 2/1653* (2013.01); *H01M 4/13* (2013.01); *H01M 4/366* (2013.01); *H01M 4/62* (2013.01); *H01M 10/052* (2013.01); *H01M 10/0585* (2013.01); *H01M 10/4235* (2013.01); *Y02E 60/122* (2013.01)

(58) Field of Classification Search
CPC ......................... H01M 2/127; H01M 10/4235
USPC .................................................. 429/212, 215
See application file for complete search history.

(56) References Cited

U.S. PATENT DOCUMENTS

| 5,714,277 | A | 2/1998 | Kawakami |
| 7,585,587 | B2 | 9/2009 | Kanno et al. |
| 2002/0034689 | A1* | 3/2002 | Hoshida et al. ............... 429/254 |
| 2003/0072996 | A1 | 4/2003 | Roh |
| 2012/0003514 | A1 | 1/2012 | Tsujikawa et al. |

FOREIGN PATENT DOCUMENTS

| CN | 102160229 A | | 8/2011 |
| EP | 1 603 175 A1 | | 12/2005 |
| EP | 2 405 519 A1 | | 1/2012 |
| JP | 6-283205 A | | 10/1994 |
| JP | 6-310174 A | | 11/1994 |
| JP | 2000-173619 A | | 6/2000 |
| JP | 2007-35391 A | | 2/2007 |
| JP | 2007035391 | * | 2/2007 |
| JP | 2007-207455 A | | 8/2007 |
| WO | WO 2004/062002 A1 | | 7/2004 |
| WO | WO 2008/018657 A1 | | 2/2008 |
| WO | WO 2008018656 | * | 2/2008 |

OTHER PUBLICATIONS

JP 2007035391—Translation.*
Corresponding International Search Report with English Translation dated Dec. 27, 2011 (four (4) pages).
Japanese Office Action dated May 27, 2014 with English translation (three pages).
Mechanical English translation of document B1 (JP 2000-173619 A) previously filed on Mar. 5, 2013 (eleven (11) pages).
Mechanical English translation of document B2 (JP 6-310174 A) previously filed on Mar. 5, 2013 (thirteen (13) pages).
Mechanical English translation of document B4 (JP 2007-35391 A) previously filed on Mar. 5, 2013 (nineteen (19) pages.
Chinese-language Office Action dated Dec. 3, 2014 with partial English translation (Fourteen (14) pages).
European Search Report dated Jul. 1, 2014 (two pages).

* cited by examiner

*Primary Examiner* — Ladan Mohaddes
(74) *Attorney, Agent, or Firm* — Crowell & Moring LLP

(57) ABSTRACT

A non-aqueous electrolyte battery in which formation of a flame retardant layer formed on the surface of an electrode or the like hardly affects the discharge characteristics is provided. A non-aqueous electrolyte battery 1 includes a positive electrode 3, a negative electrode 5, and a separator 7. A porous layer having ion permeability is formed using a flame retardant material on a surface of the positive electrode 3. The porous layer is formed by applying a hot melt, which is a fused flame retardant material made of a thermoplastic resin, to the surface of the positive electrode 3.

7 Claims, 4 Drawing Sheets

NON-AQUEOUS ELECTROLYTE BATTERY

TECHNICAL FIELD

The present invention relates to a non-aqueous electrolyte battery including a non-aqueous electrolyte.

BACKGROUND ART

Non-aqueous electrolyte batteries that use a non-aqueous electrolyte such as lithium-ion secondary batteries provide a high energy density at a high voltage and have a reduced size and a reduced weight, and thus are widely used primarily as power sources for information terminals such as personal computers and cellular phones. Common examples of the non-aqueous electrolyte used in the non-aqueous electrolyte batteries include a solution obtained by dissolving a supporting salt such as $LiPF_6$ in an aprotic organic solvent such as an ester compound and an ether compound. Because the aprotic organic solvent is flammable, however, the battery may be ignited when the liquid leaks from the battery or the battery generates an abnormal amount of heat, which is disadvantageous in terms of safety.

The possibility of expanded use of the non-aqueous electrolyte batteries as power sources for large devices such as power sources for power storage and power sources for electric vehicles has recently been studied. Therefore, it has been an important issue to enhance the safety of the non-aqueous electrolyte batteries with a view to increasing the size of the batteries. For example, Japanese Unexamined Patent Application Publication No. 2000-173619 (Patent Document 1) discloses a technology for suppressing ignition or rupture of the non-aqueous electrolyte batteries by covering the surface of a negative electrode with a phosphazene monomer which is a flame retardant material, as a technology for enhancing the safety of the batteries.

RELATED ART DOCUMENTS

Patent Document

Patent Document 1: JP2000-173619A (paragraph [0042], Table 1)

SUMMARY OF INVENTION

Technical Problem

If the surface of the electrode is covered with the flame retardant material as discussed above, it is possible to suppress ignition of the non-aqueous electrolyte battery due to an increase in internal temperature of the battery or expansion of the battery due to an increase in internal pressure of the battery. However, the presence of the flame retardant layer formed on the surface of the electrode may disadvantageously degrade the ion conductivity between the electrode and the electrolyte to reduce the intrinsic performance of the battery such as discharge characteristics.

An object of the present invention is to provide a non-aqueous electrolyte battery in which formation of a flame retardant layer on the surface of an electrode or the like hardly affects the battery performance such as discharge characteristics.

Another object of the present invention is to provide a non-aqueous electrolyte battery, ignition or rupture of which can be suppressed, even in case of abrupt discharge due to an internal short circuit, while maintaining the discharge characteristics.

Solution to Problem

The present invention improves a non-aqueous electrolyte battery including a non-aqueous electrolyte as a battery electrolyte. The non-aqueous electrolyte battery according to the present invention includes a positive electrode, a negative electrode, a separator, and a porous layer formed using a flame retardant material on a surface of at least one of the positive electrode, the negative electrode, and the separator. The phrase "surface of at least one of the positive electrode, the negative electrode, and the separator" means a surface of the positive electrode facing the separator, a surface of the negative electrode facing the separator, or a surface of the separator, for example. The porous layer is formed by applying a hot melt, which is a fused flame retardant material, to the surface of the positive electrode or the like. Herein, the flame retardant material is a thermoplastic resin that is solid at normal temperature and plasticized or fluidized when heated, and that is insoluble in a non-aqueous electrolyte and has a tendency to hinder ignition of the non-aqueous electrolyte. The hot melt is a fused flame retardant material made of such a thermoplastic resin. To apply the hot melt to the surface of the positive electrode or the like, the hot melt is ejected from a nozzle toward the surface of the positive electrode or the like. As a result, an application layer of the flame retardant material formed by applying the hot melt to the surface of the positive electrode or the like is formed as a porous layer having a plurality of pores that communicate with each other in the thickness direction similar to a so-called non-woven fabric, and exhibits good ion permeability. The term "ion permeability" means that ions can pass through the pores of the porous layer. In other words, the term "porous layer" as used herein may be expressed as an application layer in form of a non-woven fabric inside which a multiplicity of pores that communicate with each other in the thickness direction are formed.

If a flame retardant layer constituted from a porous layer formed by applying a hot melt, which is a fused flame retardant material, to the surface of the positive electrode or the like is formed as in the present invention, a flame retardant layer having ion permeability and exhibiting a tendency to suppress ignition of the electrolyte (herein, such a tendency is expressed as "flame retardant properties") can be formed on the surface of the positive electrode or the like. By virtue of its ion permeability, the thus formed porous layer does not affect the battery performance during normal battery operation. When abrupt discharge is caused by an internal short circuit or the like to increase the temperature in the battery, however, the flame retardant material is fused to perform a function of suppressing ignition of the non-aqueous electrolyte to suppress an increase in internal temperature or internal pressure of the battery. Therefore, according to the present invention, it is possible to provide a highly safe non-aqueous electrolyte battery with a low risk of ignition or a flash of the battery or of expansion, rupture, or the like of the battery without reducing the battery performance.

The hot melt is adhesive, and cured by a reduction in temperature. Therefore, the hot melt formed from a flame retardant material and applied to the surface of the positive electrode or the like is held as affixed to the surface of the positive electrode or the like. Thus, the porous layer does not disadvantageously fall down during assembly of the battery. In addition, because the porous layer used in the present invention has ion permeability, it is possible to suppress a reduction in ion conductivity between the surface of the positive electrode or the like on which the porous layer is formed and the electrolyte. Therefore, according to the present invention, it is possible to provide a highly safe non-aqueous electrolyte battery without reducing the discharge characteristics required for the non-aqueous electrolyte battery such as high voltage performance, a high discharge capacity, and large current discharge performance.

In the non-aqueous electrolyte battery, from the viewpoint of maintaining the discharge characteristics such as a high discharge capacity and large current discharge performance, the porous layer preferably has a porosity of 30 to 70%. The porosity (P) may be defined as the ratio of the volume V2 of the pores to the volume V1 of the porous layer, represented in the unit of percentage (P=V2/V1×100). In addition, the porosity (P) may also be computed by formula P=[1−d2/d1]×100, where d1 is the specific gravity (absolute specific gravity) of the flame retardant material and d2 is the specific gravity (apparent specific gravity) of the porous layer.

In the present invention, a porous layer having a porosity of 30 to 70% can be formed on the surface of the positive electrode or the like by applying a hot melt as discussed above. If the porosity is less than 30%, the ion permeability or the ion conductivity is reduced to reduce the discharge characteristics. If the porosity is more than 70°, on the other hand, the area of joint between the porous layer and the surface of the positive electrode or the like is reduced to reduce the bonding strength of the porous layer, which causes the porous layer to tend to slip off. If the porosity is more than 80%, further, the porous layer easily slips off from the surface of the positive electrode or the like, which hinders the flame retardant material from performing its flame retardant function to ensure the safety of the non-aqueous electrolyte battery.

Any method may be used to fuse the flame retardant material to apply a hot melt. In order to form a porous layer having porosity as discussed above, however, a non-contact application method is preferably used to apply a hot melt to the surface of the positive electrode or the like. The non-contact application method is a method of applying a hot melt known in the art, in which the hot melt is ejected onto the surface of an application subject without causing a nozzle of an application device to contact the application subject. In the present invention, a flame retardant material that is solid at normal temperature is heated and fused at a temperature of 90° C. or more into a hot melt, and a commercially available hot melt application device (control coat gun) is used to eject the hot melt in form of streaks onto the surface of the positive electrode or the like at a predetermined application speed while swinging at least one of the nozzle and the positive electrode or the like such that the streaks of the hot melt irregularly overlap each other in the thickness direction. This makes it possible to form a porous layer in form of a non-woven fabric having a porosity exhibiting necessary ion permeability on the surface of the positive electrode by a simple method. The term "non-woven fabric" means a three-dimensional meshwork structure that is similar to random fiber and that is non-directional in terms of mechanical strength.

From the viewpoint of applying the flame retardant material in form of a hot melt to the surface of the positive electrode or the like, the flame retardant material preferably has a melting point of 90° C. or more. A flame retardant material having a melting point of 90° C. or more is solid at normal temperature, and plasticized or fluidized at 90° C. or more. The ignition temperature of most electrolytes is higher than 90° C. Therefore, if such a flame retardant material is used, the flame retardant material is not softened before the temperature in the battery approaches the ignition temperature of the electrolyte.

Therefore, the safety of the battery can be enhanced without affecting the battery performance. From the viewpoint of ensuring the porosity of the porous layer formed on the surface of the positive electrode or the like, the flame retardant material preferably has a viscosity of 1000 to 3500 mPa·s when fused. If the viscosity when fused is less than 1000 mPa·s, the viscosity of the hot melt is so low that a porous layer having ion permeability may not be formed. This degrades the ion conductivity of the electrode to reduce the high-rate discharge characteristics. If the viscosity when fused is more than 3500 mPa·s, meanwhile, the viscosity of the hot melt is so high that the hot melt is discontinuously dispensed from the nozzle to make it difficult to form a layer in form of a non-woven fabric. This reduces the high-rate discharge characteristics.

When seen differently, the porous layer is preferably configured to contain the flame retardant material in an amount of 3.5 to 7.5 wt % per a positive active material of the positive electrode. The content of the flame retardant material is represented in the unit of wt % of the flame retardant material with respect to 100 wt % of the positive active material in consideration of the fact that ignition (smoke generation) of the battery is caused at the positive electrode. That is, the amount of the flame retardant material used is determined with reference to the positive active material which generates oxygen radicals in consideration of the fact that the flame retardant effect is obtained by the flame retardant material capturing (trapping) oxygen radicals generated at the positive electrode (specifically, the positive active material) when the battery generates an abnormal amount of heat. If the content of the flame retardant material per the positive active material of the positive electrode is in the range of less than 3.5 wt %, the amount of the flame retardant material is so small that a sufficient effect of the flame retardant material disposed in the battery may possibly not be obtained, although some effect is obtained. If the content of the flame retardant material per the positive active material is in the range of more than 7.5 wt %, meanwhile, the volume of the porous layer is increased to degrade the ion conductivity to reduce the battery characteristics. For the purpose of enhancing the safety in exchange for a reduction in battery characteristics, the content of the flame retardant material may be in the range of more than 7.5 wt %. In order to ensure sufficient safety of the non-aqueous electrolyte battery while maintaining the battery performance, however, the content of the flame retardant material per the positive active material is preferably in the range of 3.5 to 7.5 wt %.

The flame retardant material may be a phosphazene compound that is solid at normal temperature and that is fused into a hot melt when heated, for example. By applying such a phosphazene compound as a hot melt, a porous layer serving as a flame retardant layer can be formed on the surface of the positive electrode or the like as reliably affixed thereto without other components such as a binder. The phosphazene compound, because of its structure, has a tendency to capture (trap) oxygen in the non-aqueous electrolyte (for example, oxygen radicals generated at the positive electrode when the battery generates an abnormal amount of heat). Utilizing such a tendency, a thermal runaway reaction of the battery can be efficiently suppressed by forming the phosphazene compound on the surface of the positive electrode.

As such a phosphazene compound, in particular, a cyclic phosphazene compound of formula (I) may be used.

<formula I>

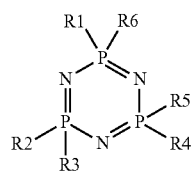

(I)

In the formula, R1 to R6 may each be an organic group having one to ten carbon atoms, and R1 to R6 may have the same number of carbon atoms or different numbers of carbon atoms. Examples of the organic group that can be utilized as R1 to R6 include: alkyl groups such as a methyl group, an ethyl group, a propyl group, a butyl group, a pentyl group, a hexyl group, a heptyl group, an octyl group, a nonyl group, and a decyl group; alkoxy groups such as a methoxy group, an ethoxy group, a propoxy group, a butoxy group, a pentoxy group, a hexyloxy group, a heptyloxy group, and an octyloxy group; alkoxy alkyl groups such as a methoxy methyl group, an ethoxy methyl group, a propoxy methyl group, a butoxy methyl group, a methoxy ethyl group, an ethoxy ethyl group, a propoxy ethyl group, a methoxy propyl group, an ethoxy propyl group, and a propoxy propyl group; alkenyl groups such as a vinyl group, a 1-propenyl group, a 2-propenyl group, 1-butenyl group, a 1-pentenyl group, 3-butenyl group, a 3-pentenyl group, a 2-fluoroethenyl group, a 2,2-difluoroethenyl group, a 1,2,2-trifluoroethenyl group, a 4,4-difluoro-3-butenyl group, a 3,3-difluoro-2-propenyl group, and a 5,5-difluoro-4-pentenyl group; aryl groups such as a phenyl group; and aryloxy groups such as a phenoxy group. Among these, a methyl group, an ethyl group, and a 1,2,2-trifluoroethenyl group are preferable.

Hydrogen atoms in R1 to R3 may be replaced with fluorine atoms. If the hydrogen atoms in R1 to R3 are replaced with fluorine atoms, the chemical stability may be easily enhanced.

DESCRIPTION OF EMBODIMENTS

Figure 1A:
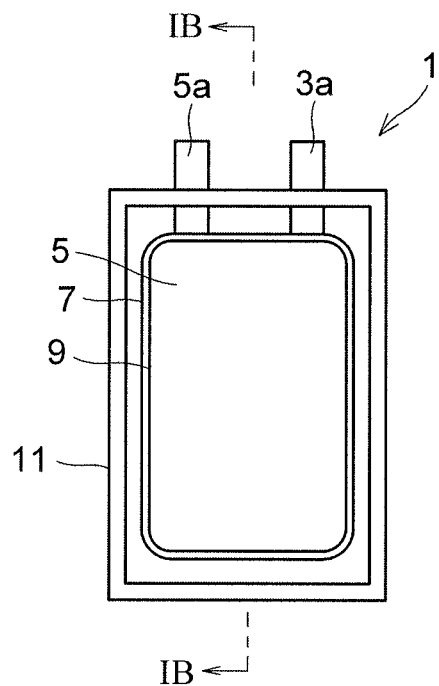
FIG. 1A is a schematic view showing the inside of a lithium-ion secondary battery used as a non-aqueous electrolyte battery according to the present invention in a transparent state.
Figure 1B:
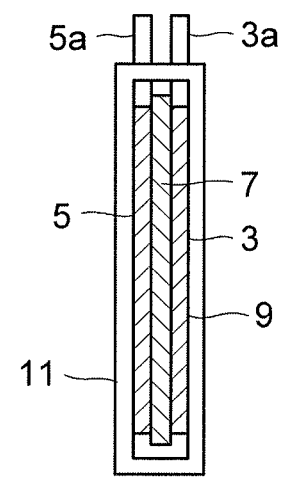
FIG. 1B is a cross-sectional view taken along the line IB-IB of FIG. 1A.

An embodiment of the present invention will be described in detail below. FIG. 1A is a schematic view showing the inside of a lithium-ion secondary battery as a non-aqueous electrolyte battery according to the embodiment of the present invention in a transparent state, and FIG. 1B is a cross-sectional view taken along the line IB-IB of FIG. 1A. A lithium-ion secondary battery 1 includes a positive electrode 3 including a positive lead terminal 3a, a negative electrode 5 including a negative lead terminal 5a, and a separator 7 disposed between the positive electrode 3 and the negative electrode 5. The positive electrode 3, the negative electrode 5, and the separator 7 are laminated to form a laminated member 9. The lithium-ion secondary battery 1 is structured such that the laminated member 9 is disposed in a case 11 with the positive lead terminal 3a and the negative lead terminal 5a extending out of the case 11 to be connectable.

EXAMPLES

The lithium-ion secondary battery 1 was fabricated as follows. First, a non-aqueous electrolyte was prepared. A mixed solvent was prepared from 50 vol % of ethylene carbonate and 50 vol % of dimethyl carbonate, and 1 mol/L of $LiPF_6$ was dissolved in the mixed solvent to prepare the non-aqueous electrolyte.

Next, a positive electrode was fabricated. A lithium-cobalt complex oxide ($LiCoO_2$) was used as a positive active material of the positive electrode. First, the lithium-cobalt complex oxide, acetylene black serving as a conducting agent, and polyvinylidene fluoride serving as a binding agent were mixed at a mass ratio of 90:5:5, and the mixture was dispersed in a solvent of N-methylpyrrolidone to prepare slurry. The slurry was applied to an aluminum foil serving as a positive current collecting member, and dried. After that, the aluminum foil was subjected to pressing to fabricate a positive electrode sheet.

Further, a hot melt, which is a fused flame retardant material, was applied to the surface of the positive electrode. As the flame retardant material, a cyclic phosphazene compound (hereinafter referred to as "phosphazene compound A") of formula (I) in which two of all the R's are phenoxy groups, two R's are phenyl groups, and the remaining two R's are dimethylamino groups was used. The cyclic phosphazene compound is solid at normal temperature, and fused into a hot melt when heated. By applying such a phosphazene compound as a hot melt, a porous layer serving as a flame retardant layer can be formed on the surface of the positive electrode or the like as reliably affixed thereto without other components such as a binder.

Figure 2:
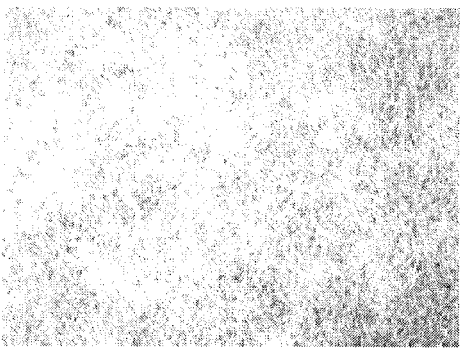
FIG. 2 is a photograph in which the surface of a porous layer formed on the surface of a positive electrode of the non-aqueous electrolyte battery according to the present invention is captured using an optical microscope at a magnification of 150 times.

The flame retardant was applied by a non-contact application method. Specifically, a control gun CC200 (trademark) manufactured by Nordson Corporation was used as an application device to eject a hot melt of the phosphazene compound A fused at 160° C. onto the surface of the positive electrode sheet at an application speed of 45 m/min while swinging a nozzle such that an application layer is formed on the surface of the positive electrode sheet in form of a nonwoven fabric in which streaks of the hot melt sprayed from the nozzle irregularly overlap each other in the thickness direction. FIG. 2 is a photograph in which the surface of the application layer formed on the surface of the positive electrode sheet is captured using an optical microscope at a magnification of 150 times. As shown in the photomicrograph, the application layer formed on the surface of the positive electrode sheet was formed as a porous layer in form of a nonwoven fabric. The positive electrode sheet on which such an application layer was formed was cut to a size of 10 cm×20 cm, and a current collecting tab formed from an aluminum foil was welded to the positive electrode sheet to fabricate the positive electrode.

Next, a negative electrode was fabricated. Artificial graphite was used as a negative active material. The artificial graphite and polyvinylidene fluoride serving as a binding agent were mixed at a mass ratio of 90:10, and the mixture was dispersed in a solvent of N-methylpyrrolidone to prepare slurry. The slurry was applied to a copper foil serving as a negative current collecting member, and dried. After that, the copper foil was subjected to pressing to fabricate a negative electrode sheet. The negative electrode sheet was cut to a size of 10 cm×20 cm, and a current collecting tab formed from a nickel foil was welded to the cut sheet to fabricate the negative electrode.

A separator sheet made of polyethylene was interposed between the positive electrode and the negative electrode fabricated as described above. The positive electrode, the negative electrode, and the separator sheet were laminated to fabricate a laminated group having a battery capacity of 8 Ah. The laminated group was inserted into an exterior member (case 11) made of a heat seal film (aluminum lamination film) and having one open end, and the prepared non-aqueous electrolyte was further injected into the exterior member. After that, the exterior member was evacuated, and the opening of the exterior member was quickly heat sealed to fabricate a non-aqueous electrolyte battery (lithium-ion secondary battery 1) having the structure of a flat laminated battery.

The flame retardant properties of the thus fabricated non-aqueous electrolyte battery were evaluated by the method described in (1) below. Specifically, the flame retardant properties were evaluated for Experimental Examples 1 to 7 in which the amount of the flame retardant material (phosphazene compound A) applied was varied. The amount of the flame retardant material (phosphazene compound A) applied is represented in the unit of wt % of the flame retardant material per the positive active material. The results of the evaluation of the flame retardant properties are shown in Table 1.

(1) Nail Protrusion Safety Test

A nail protrusion safety test was conducted for the fabricated laminated battery. In the nail penetration test, first, a charge-discharge cycle was repeated twice at a current density of 0.1 mA/cm$^2$ in a voltage range of 4.2 to 3.0 V in an environment at 25° C., and further the battery was charged to 4.2 V. After that, a nail made of stainless steel and having a shaft with a diameter of 3 mm was vertically stuck in the center of a side surface of the battery at a speed of 0.5 cm/s at the same temperature of 25° C. to examine whether or not the battery ignited or smoked and whether or not the battery was ruptured or expanded.

TABLE 1

| | Amount applied (wt %) | Ignition/ smoke | Rupture/ expansion | Battery temperature at internal short circuit (° C.) |
|---|---|---|---|---|
| Experiment Example 1 | 0.0 | Smoked | Expanded | 352 |
| Experiment Example 2 | 1.0 | Smoked | Expanded | 232 |
| Experiment Example 3 | 2.5 | None | Expanded | 153 |
| Experiment Example 4 | 3.5 | None | None | 106 |
| Experiment Example 5 | 5.0 | None | None | 81 |
| Experiment Example 6 | 7.5 | None | None | 60 |
| Experiment Example 7 | 10.0 | None | None | 43 |

As shown in Table 1, it was observed that the battery smoked in the example in which no flame retardant material (phosphazene compound A) was applied (Experimental Example 1) and in the example in which the flame retardant material was applied in an amount of 1.0 wt % (Experiment Example 2), and it was observed that the battery was expanded in the example in which no flame retardant material (phosphazene compound A) was applied (Experimental Example 1), in the example in which the flame retardant material was applied in an amount of 1.0 wt % (Experiment Example 2), and in the example in which the flame retardant material was applied in an amount of 2.5 wt % (Experiment Example 3). From these results, it was found that ignition or smoke generation due to thermal runaway at the time of an internal short circuit was suppressed, rupture or expansion of the battery was suppressed, and the safety of the non-aqueous electrolyte battery was enhanced for the non-aqueous electrolyte batteries in which the flame retardant material (phosphazene compound A) was contained in an amount of 3.5 to 10.0 wt % (Experiment Examples 4 to 7). That is, it was found that the effect of suppressing thermal runaway of the battery was insufficient if the flame retardant material (phosphazene compound A) was applied in an amount of less than 3.5 wt %, and that the amount (weight) of the flame retardant material applied was preferably at least equal to or more than 3.5 wt % with respect to the weight of the positive active material.

Figure 3:
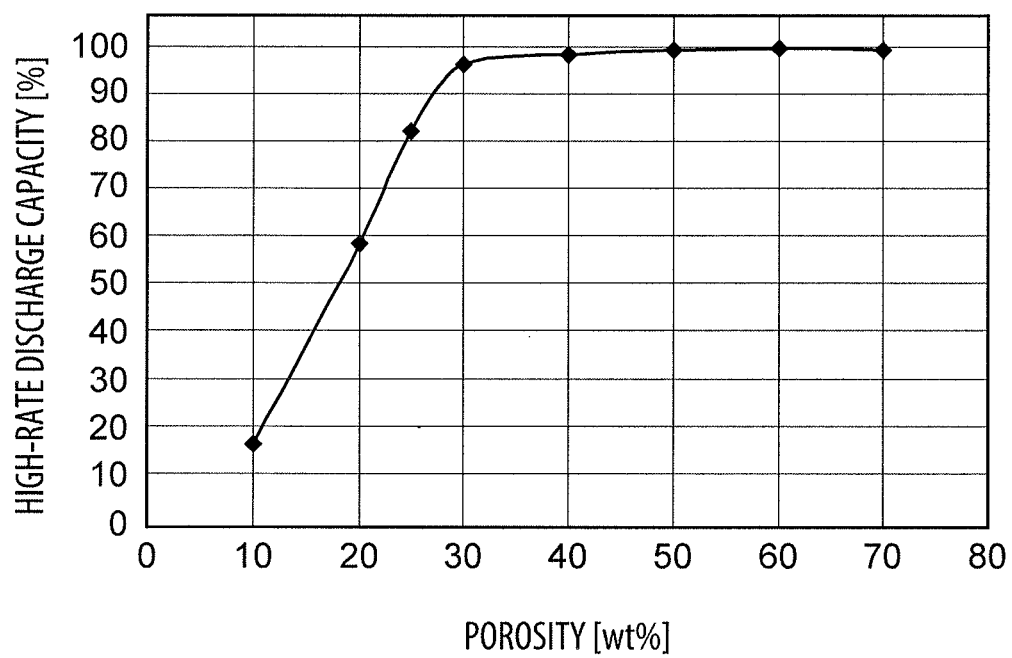
FIG. 3 shows the relationship between the porosity of the porous layer formed by applying a hot melt, which is a fused flame retardant material (phosphazene compound), to the surface of the positive electrode and the high-rate discharge capacity.

In addition, the relationship between the state of the porous layer and the discharge characteristics was examined for the fabricated laminated battery. The discharge characteristics were examined by the method described in (2) below. Specifically, the flame retardant material (phosphazene compound A) was applied in an amount of 3.5 wt % with respect to the weight of the positive active material to form a porous layer, and the high-rate discharge capacity was examined while varying the porosity (Experiment Examples 8 to 18). The porosity was computed by formula $P=[1-d2/d1]\times 100$, where d1 is the specific gravity (absolute specific gravity) of the flame retardant material and d2 is the specific gravity (apparent specific gravity) of the porous layer. The results are shown in Table 2 and FIG. 3.

(2) High-Rate Discharge Test

A high-rate discharge test was conducted for the fabricated non-aqueous electrolyte battery (laminated battery). The battery was charged at 25° C. under the same conditions as those for the nail protrusion safety test in (1) above (conditions similar to those for initial charge-discharge processes). After that, a constant current discharge was performed at a current of 24 A to a final voltage of 3.0 V. The obtained discharge capacity was defined as the high-rate discharge capacity.

TABLE 2

| | Porosity (%) | High-rate discharge capacity (%) |
|---|---|---|
| Experiment Example 8 | — | 100.0 |
| Experiment Example 9 | 10 | 16.2 |
| Experiment Example 10 | 20 | 58.3 |
| Experiment Example 11 | 25 | 82.1 |
| Experiment Example 12 | 30 | 96.0 |
| Experiment Example 13 | 40 | 98.2 |
| Experiment Example 14 | 50 | 99.3 |
| Experiment Example 15 | 60 | 99.4 |
| Experiment Example 16 | 70 | 99.2 |
| Experiment Example 17 | 80 | — |
| Experiment Example 18 | 90 | — |

The high-rate discharge capacity for the example in which no flame retardant material (phosphazene compound A) was applied (Experimental Example 8) was defined as 100%. Then, as shown in Table 2 and FIG. 3, for porosities of 10% to 25% (Experiment Examples 9 to 11), the high-rate discharge capacity was less than 95%. This indicates that the ion permeability or the ion conductivity was reduced to reduce the discharge characteristics. For porosities of 30% to 70% (Experiment Examples 12 to 16), in contrast, the high-rate discharge capacity was more than 95%. It was observed that the porous layer tended to slip off for a porosity of 80% (Experiment Example 17), and that the porous layer easily slipped off from the surface of the positive electrode for a porosity of 90% (Experiment Example 18). These tendencies are considered to be because the area of joint between the porous layer and the surface of the positive electrode or the like was reduced to reduce the bonding strength of the porous layer. From these results, it was found that the porosity of the porous layer formed on the surface of the positive electrode was preferably in the range of 30 to 70%. That is, it was found that the high-rate discharge capacity was reduced to a smaller degree and the battery performance was affected to a smaller degree when the flame retardant material (phosphazene compound A) was applied to the surface of the positive electrode such that the porosity of the resulting porous layer was 30 to 70% than no phosphazene compound was applied.

Further, the relationship between the amount of the flame retardant material (phosphazene compound A) applied and the discharge characteristics was examined for the fabricated laminated battery. The discharge characteristics were examined by the method described in (2) above as in the case where the relationship between the porosity and the discharge characteristics was examined as discussed above. Specifically, the high-rate discharge capacity was examined for Experiment Examples 19 to 25 in which the amount of the flame retardant material (phosphazene compound A) applied (in the unit of wt % with respect to the weight of the positive active material) was varied such that the porosity of the resulting porous layer was 50%. The results are shown in Table 3.

TABLE 3

| | Amount applied (wt %) | High-rate discharge capacity (%) |
|---|---|---|
| Experiment Example 19 | — | 100.0 |
| Experiment Example 20 | 3.5 | 99.3 |
| Experiment Example 21 | 5.0 | 98.4 |
| Experiment Example 22 | 7.5 | 97.6 |
| Experiment Example 23 | 10.0 | 92.0 |
| Experiment Example 24 | 12.5 | 81.3 |
| Experiment Example 25 | 15.0 | 71.1 |

The high-rate discharge capacity for the example in which no flame retardant material (phosphazene compound A) was applied (Experimental Example 19) was defined as 100%. Then, as shown in Table 3, for application amounts of the flame retardant material (phosphazene compound A) of 3.5 wt % to 7.5 wt % (Experiment Examples 20 to 22), the high-rate discharge capacity was more than 95%. For application amounts of 10 wt % to 15 wt % (Experiment Examples 23 to 25), in contrast, the high-rate discharge capacity was less than 95%. From these results, it was found that the amount of the flame retardant material (phosphazene compound A) applied to the surface of the positive electrode was preferably in the range of 3.5 wt % to 7.5 wt %. That is, the high-rate discharge capacity was reduced to a smaller degree and the battery performance was affected to a smaller degree when the flame retardant material (phosphazene compound A) was applied in an amount of 3.5 to 7.5 wt % than no flame retardant material (phosphazene compound) was applied. If the content of the flame retardant material is in the range of less than 3.5 wt %, the amount of the flame retardant material is so small that a sufficient effect of the flame retardant material disposed in the battery as discussed above may not be obtained. The battery characteristics were reduced when the amount of the flame retardant material (phosphazene compound A) applied was more than 7.5 wt %, and it is considered to be because movement of lithium ions was hindered (ion conductivity is degraded) by an increase in thickness of the flame retardant layer (volume of the porous layer) with the porosity kept at 50%.

Figure 4:
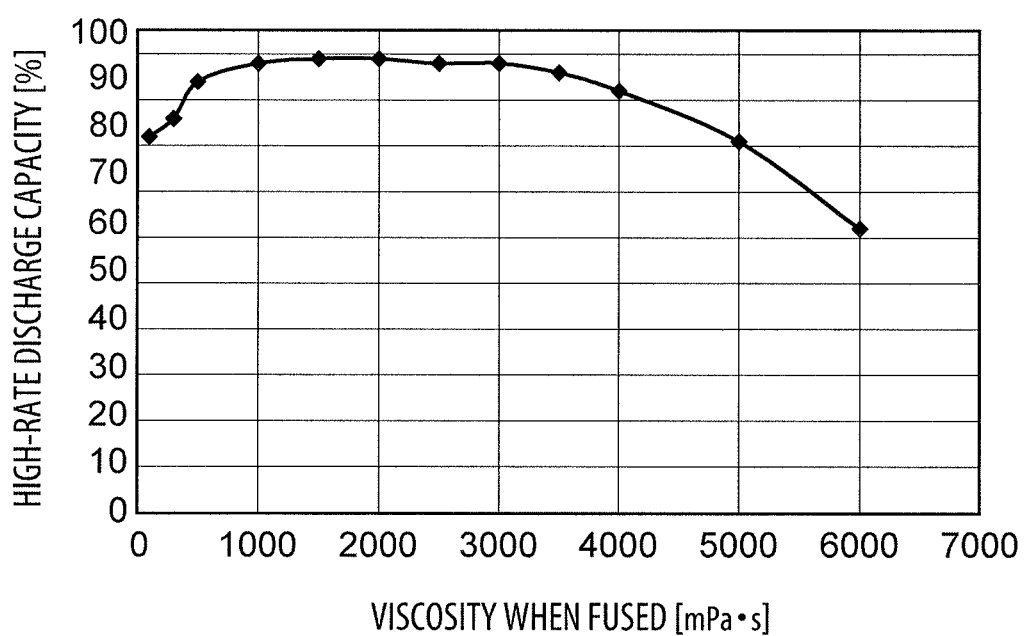
FIG. 4 shows the relationship between the viscosity when fused of the flame retardant material (phosphazene compound) used in the present invention and the high-rate discharge capacity.

Moreover, the relationship between the viscosity of the flame retardant material (phosphazene compound A) at the time of application and the discharge characteristics was examined for the fabricated laminated battery. The discharge characteristics were examined by the method described in (2) above as in the case where the relationship between the porosity and the discharge characteristics was examined as discussed above. Specifically, the flame retardant material (phosphazene compound A) was applied in an amount of 3.5 wt % with respect to the weight of the positive active material, and the high-rate discharge capacity was examined for Experiment Examples 26 to 39 in which the viscosity when fused of the flame retardant material (phosphazene compound A) was varied. The results are shown in Table 4 and FIG. 4.

TABLE 4

| | Viscosity (mPa · s) | High-rate discharge capacity (%) |
|---|---|---|
| Experiment Example 26 | — | 100.0 |
| Experiment Example 27 | 100 | 82.2 |
| Experiment Example 28 | 300 | 86.4 |
| Experiment Example 29 | 500 | 94.3 |
| Experiment Example 30 | 1000 | 98.1 |
| Experiment Example 31 | 1500 | 98.8 |
| Experiment Example 32 | 2000 | 99.3 |
| Experiment Example 33 | 2500 | 98.4 |
| Experiment Example 34 | 3000 | 98.2 |
| Experiment Example 35 | 3500 | 96.3 |
| Experiment Example 36 | 4000 | 92.4 |
| Experiment Example 37 | 5000 | 81.1 |
| Experiment Example 38 | 6000 | 62.5 |
| Experiment Example 39 | 7000 | — |

The high-rate discharge capacity for the example in which no flame retardant material (phosphazene compound A) was applied (Experimental Example 26) was defined as 100%. Then, as shown in Table 4 and FIG. 4, for viscosities when fused of the flame retardant material (phosphazene compound A) of less than 1000 mPa·s (Experiment Examples 27 to 29) and of 4000 to 6000 mPa·s (Experiment Examples 36 to 38), the high-rate discharge capacity was all less than 95%. For a viscosity when fused of 7000 mPa·s (Experiment Example 39), it was difficult to apply the flame retardant material (phosphazene compound A), and it was not possible to form a porous layer on the surface of the positive electrode. For viscosities when fused of the flame retardant material (phosphazene compound A) of 1000 to 3500 mPa·s (Experiment Examples 30 to 35), in contrast, the high-rate discharge capacity was more than 95%. From these results, it was found that the viscosity when fused of the flame retardant material (phosphazene compound A) was preferably in the range of 1000 to 3500 mPa·s. The high-rate discharge characteristics were reduced when the viscosity when fused of the flame retardant material (phosphazene compound A) was less than 1000 mPa·s, and it is considered to be because the viscosity of the hot melt was so low that it was not possible to form a porous layer having ion permeability, which degraded the ion conductivity of the electrode. Meanwhile, the high-rate discharge characteristics were reduced when the viscosity when fused of the flame retardant material (phosphazene compound A) was more than 3500 mPa·s, and it is considered to be because the viscosity of the hot melt was so high that the hot melt was discontinuously dispensed from the nozzle to make it difficult to form a layer in form of a non-woven fabric, which did not make it possible to ensure the porosity of the porous layer.

Although an embodiment and examples of the present invention have been specifically described above, the present invention is not limited to such an embodiment and examples, and it is a matter of course that changes may be made based on the technical concept of the present invention.

INDUSTRIAL APPLICABILITY

According to the present invention, a flame retardant layer formed from a porous layer formed by applying a hot melt, which is a fused flame retardant material, to the surface of a positive electrode or the like is formed. Thus, a flame retardant layer having ion permeability and exhibiting flame retardant properties can be formed on the surface of the positive electrode or the like. Therefore, while the intrinsic performance of a battery can be maintained when the battery is normal (when the battery does not generate an abnormal amount of heat because of an internal short circuit or the like), the flame retardant material is fused to perform a function of suppressing ignition of a non-aqueous electrolyte to suppress an increase in internal temperature or internal pressure of the battery when the battery is abnormal (when abrupt discharge is caused by an internal short circuit or the like to increase the temperature in the battery). As a result, according to the present invention, it is possible to provide a highly safe non-aqueous electrolyte battery with a low risk of ignition or a flash of the battery or of expand, rupture, or the like of the battery without reducing the battery performance.

REFERENCE SIGN LIST 1 lithium-ion secondary battery
3 positive electrode
5 negative electrode
7 separator
9 laminated member
11 case

The invention claimed is:

1. A non-aqueous electrolyte battery comprising:
a positive electrode;
a negative electrode;
a non-aqueous electrolyte;
a separator; and
a porous layer directly on a surface of the positive electrode, wherein the porous layer is in the form of a non-woven fabric, has ion permeability, has a porosity of 30 to 70%, and contains a flame retardant material in an amount of 3.5 to 7.5 wt % per positive active material of the positive electrode; and
wherein the flame retardant material is a phosphazene compound that is solid at temperatures below 90° C. and that is fused into a hot melt when heated.

2. The non-aqueous electrolyte battery according to claim 1, wherein the flame retardant material has a melting point of 90° C. or more, and has a viscosity of 1000 to 3500 mPa·s when fused.

3. The non-aqueous electrolyte battery according to claim 1, wherein the phosphazene compound is a cyclic phosphazene compound.

4. The non-aqueous electrolyte battery according to claim 3, wherein the cyclic phosphazene compound is a phosphazene compound of formula (I):

<formula I>

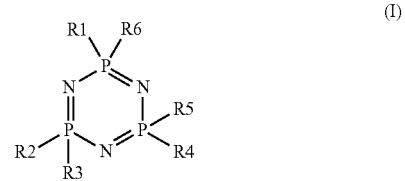

(I)

where R1 to R6 are each an alkyl group, an alkoxy group, an alkoxy alkyl group, an alkenyl group, an aryl group, or an aryloxy group having one to ten carbon atoms, R1 to R6 are the same as or different from each other, and hydrogen atoms in R1 to R3 may be replaced with fluorine atoms.

5. The non-aqueous electrolyte battery according to claim 1, wherein the porous layer is formed directly on the surface of the positive electrode facing the separator.

6. The non-aqueous electrolyte battery according to claim 1, wherein the porous layer is formed by a non-contact application method in which the hot melt is ejected onto the surface without causing a nozzle to contact the surface.

7. The non-aqueous electrolyte battery according to claim 6, wherein the non-contact application method forms an application layer in form of a non-woven fabric on the surface by ejecting the hot melt from the nozzle in form of streaks.

* * * * *